United States Patent [19]

Hapstack

[11] Patent Number: 5,018,451
[45] Date of Patent: May 28, 1991

[54] EXTENDABLE PIPE CRAWLER

[75] Inventor: Mark Hapstack, North Augusta, S.C.

[73] Assignee: The United States of America as represented by the United States Department of Energy, Washington, D.C.

[21] Appl. No.: 461,591

[22] Filed: Jan. 5, 1990

[51] Int. Cl.⁵ .............................................. B61B 13/10
[52] U.S. Cl. ................................................ 104/138.2
[58] Field of Search .................... 104/138.1, 138.2; 105/157.1, 176, 177, 199.1, 218.1, 365

[56] References Cited

U.S. PATENT DOCUMENTS

| | | | |
|---|---|---|---|
| 4,112,850 | 9/1978 | Sigel-Gfeller | 104/138.2 |
| 4,177,734 | 12/1979 | Rhoden | 378/60 X |
| 4,244,296 | 1/1981 | Vertut | 104/138.2 |
| 4,369,713 | 1/1983 | Richardson | 104/138.2 |
| 4,432,271 | 2/1984 | Wentzell et al. | 254/134.6 |
| 4,457,236 | 7/1984 | Akhmadiev et al. | 104/138.2 |
| 4,537,136 | 8/1985 | Douglas | 104/138.2 |
| 4,654,702 | 3/1987 | Tolino et al. | 104/138.2 |
| 4,677,865 | 7/1987 | Lehmann | 104/138.2 |
| 4,690,006 | 9/1987 | Urata | 73/866.5 |
| 4,722,001 | 1/1988 | Rohrich et al. | 104/138.2 |
| 4,770,105 | 9/1988 | Takagi et al. | 104/138.2 |
| 4,862,808 | 9/1989 | Hedgcoxe et al. | 104/138.2 |

FOREIGN PATENT DOCUMENTS 105839  6/1983  Japan .................... 104/138.2

Primary Examiner—Robert J. Oberleitner
Assistant Examiner—S. Joseph Morano
Attorney, Agent, or Firm—Harold M. Dixon; Stephen D. Hamel; William R. Moser

[57] ABSTRACT

A pipe crawler having a front leg assembly and a back leg assembly connected together by two air cylinders, each leg assembly having four extendable legs and a pair of actuators for sliding the extendable legs radially outward to increase the range of the legs when the pipe crawler enters a section of a pipe having a larger diameter. The crawler crawls by "inchworm"-like motion, the front leg assembly and back leg assembly alternately engaging and disengaging the wall of the pipe to hold the pipe crawler as the air cylinders alternately advance the front leg assembly and bring up the rear leg assembly. The pair of actuators of each leg assembly are parallel, adjacent and opposing acting so that each slides two adjacent extendable legs radially outward.

8 Claims, 4 Drawing Sheets

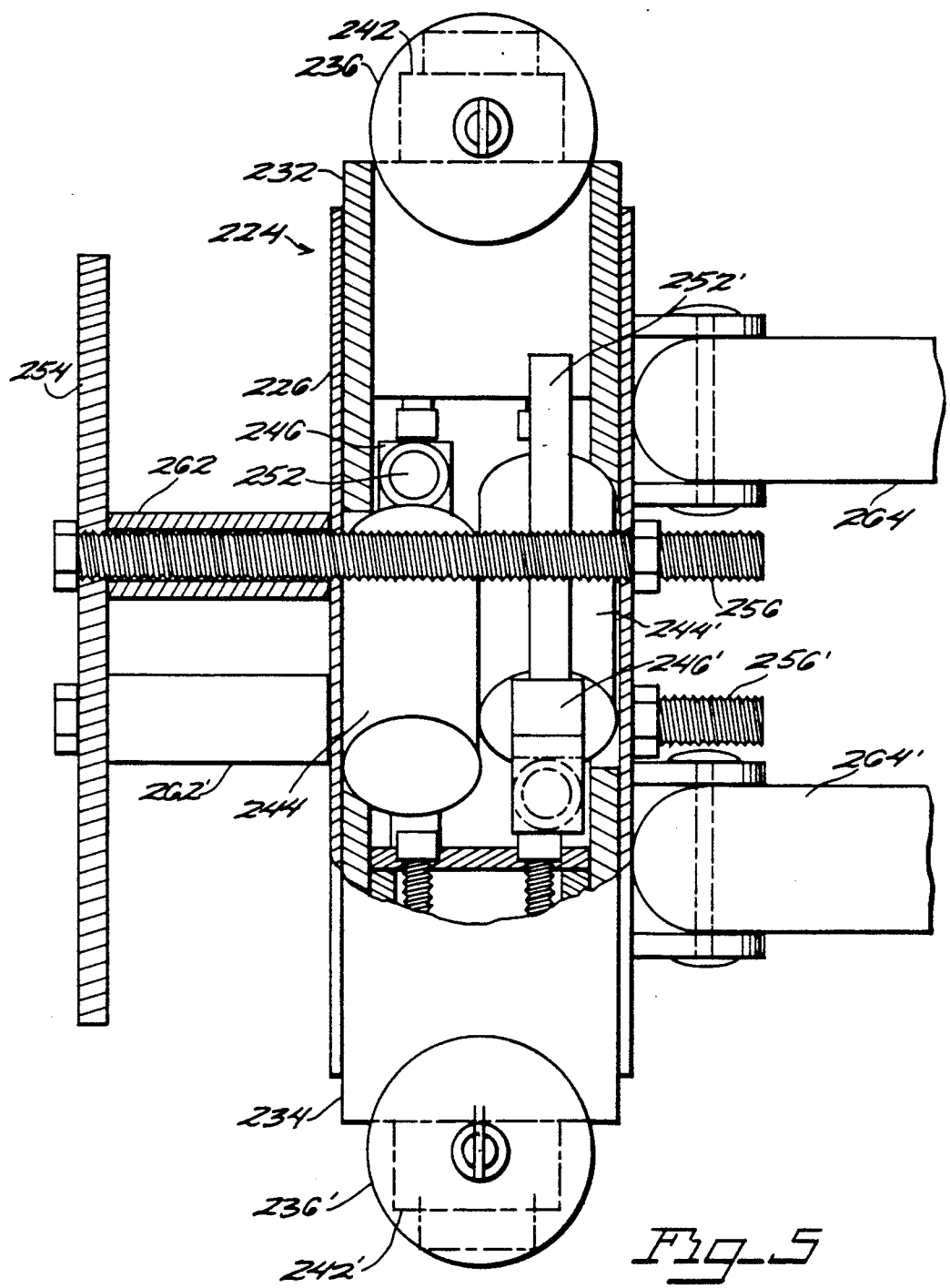
Fig_5

EXTENDABLE PIPE CRAWLER

BACKGROUND OF THE INVENTION

1. Field of the Invention and Contract Statement

The United States Government has rights in this invention pursuant to Contract No. DE-AC09-76SR00001 between the U.S. Department of Energy and E. I. DuPont de Nemours & Co.

The present invention relates to pipe crawlers. More specifically, the present invention relates to apparatus for moving through large diameter pipes, conduits, and the like, for inspection thereof.

2. Discussion of Background

From time to time the interiors of large diameter pipes, conduits, and the like, must be inspected for cracks, corrosion, defects in welding and other purposes. If the pipe is lengthy and has a diameter on the order of 30 to 45 centimeters, or if the interior of the pipe has been irradiated or is contaminated with radioactive or other hazardous material, it is preferable to send a pipe crawler through the pipe to carry the appropriate inspection equipment or to push or pull other objects through the pipe. If the pipe is of uniform internal diameter, horizontal and straight, pipe crawler design is greatly simplified. If the pipe is nonuniform or has vertical sections, bends, "Y's" and elbows, especially if the pipe diameter varies substantially, crawler design becomes considerably more complex. Pipe crawlers with a walking motion, where foot pads issue from leg assemblies to engage a pipe wall are known. For example, see U.S. Pat. No. 4,432,271 issued to Wentzell. However, the range of pipe diameters negotiable by such crawlers is limited to the stroke length of the cylinders actuating the foot pads of the individual legs. Since the legs of these crawlers are usually opposingly arranged, the length of each cylinder is limited to avoid interference with the opposing cylinder. There is a need for a pipe crawler that has the wider radial range of motion to negotiate pipes of varying diameters and shapes.

SUMMARY OF THE INVENTION

It is an object of the present invention to provide a pipe crawler that has a greater range of radial motion so that it can move through pipes having various shapes and internal diameters. These and other objects are provided by a pipe crawler having, according to its major aspects, a front leg assembly and a rear leg assembly interconnected in spaced relation by a means capable of changing the spacing between front and rear leg assemblies, such as a pair of pneumatic cylinders. Each leg assembly has radially extendable legs; each leg has a foot pad that reaches out therefrom to engage the wall of the pipe. Actuators operatively connected to the extendable legs extend the legs of a leg assembly radially outward so that the range of each extendable leg is thereby increased.

Actuators preferably comprise a pair of air cylinders mounted in the center of the leg assembly between the legs, oriented parallel and between two adjacent legs. Each air cylinder is disposed to extend the two adjacent legs at the same time.

It is a feature of the present invention that the range of the foot pads of the leg assemblies can be increased by moving the extendable legs outwardly so that the pipe crawler can crawl through pipes with greatly varying diameters.

It is a feature of the present invention that the actuators extend more than one of the extendable legs at a time. This feature reduces the number of actuators needed and increases the space allowable for each actuator so that it can extend the legs of its leg assembly farther.

These and other features and advantages of the present invention will be apparent to those skilled in the art of pipe crawlers from the following detailed description of the present invention and the drawings.

BRIEF DESCRIPTION OF THE DRAWINGS

In the drawings:

FIG. 5 is a detailed side view showing the coupling assembly and housing penetrations according to the present invention.

DETAILED DESCRIPTION OF A PREFERRED EMBODIMENT

Figure 1:
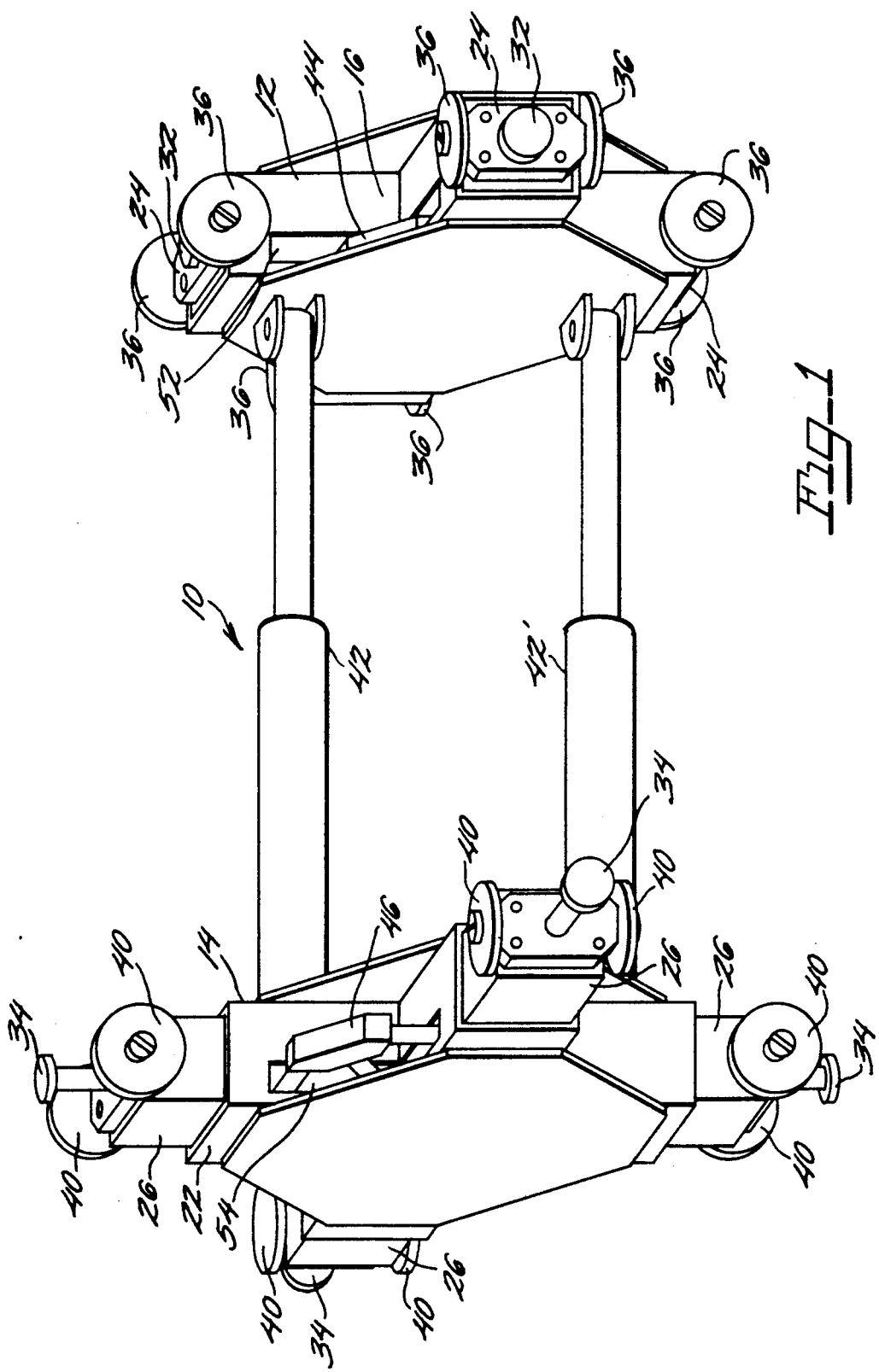
FIG. 1 is a perspective view of a pipe crawler according to the present invention.

Referring now to FIG. 1, there is illustrated a pipe crawler 10 according to the present invention. Pipe crawler 10 comprises a front leg assembly 12 and a rear leg assembly 14 spaced apart from front leg assembly 12. Front leg assembly 12 has a front leg assembly housing 16. Rear leg assembly 14 has a rear leg assembly housing 22.

Front leg assembly housing 16 houses a plurality of extendable legs 24, with four extendable legs 24 shown in FIG. 1. Different numbers of extendable legs are possible but preferably a symmetric arrangement of an even number of legs, with four legs oriented ninety degrees apart is most preferred.

Rear leg assembly housing 22 also has a plurality of extendable legs 26, four legs 26 shown in FIG. 1. It is not necessary that front leg assembly 12 and rear leg assembly 14 have the same number of extendable legs or that extendable legs 26 be aligned with extendable legs 24. It is important, however, that each leg assembly have sufficient legs to support independently pipe crawler 10 regardless of the orientation of pipe crawler 10 in a pipe.

Each extendable leg 24 and 26, of front and rear leg assemblies 12 and 14, respectively, has a foot pad 32 and 34 and two wheels 36 and 40.

Front and rear leg assemblies 12 and 14 are held in spaced relation with respect to each other by a pair of pneumatic cylinders 42 and 42', or other convenient means for changing the spacing between front and rear leg assemblies 12 and 14 such as air cylinders. Cylinders 42, 42' are attached to front and rear leg assemblies, 12, 14, but are provided with some degree of lateral flexibility for pipe crawler 10 to assist in negotiating curved sections of pipe. The ability of a pipe crawler to negotiate bends in the pipe also depends on the radius of the bend, the diameter of the pipe crawler and the length of the pipe crawler. Other numbers of cylinders can be used, including a single one. The power supply for cylinders 42 and any inspection equipment carried by the pipe crawler, not shown in FIG. 1, would be carried by or supplied to pipe crawler 10 in any conventional manner.

In a smaller diameter pipe, pipe crawler 10 can crawl (in a manner to be described below) without extending extendable legs 24 and 26. Front leg assembly 12 is shown with extendable legs 24 in a retracted position. In a larger diameter pipe and for certain shapes of pipes, pipe crawler 10 crawls with extendable legs 24 and 26 in extended position. Rear leg assembly 14 is shown with extendable legs 26 in an extended position. For example, a pipe crawler designed to just fit in and crawl through a 30 centimeter pipe can, with extendable legs extended, crawl through a 40 centimeter pipe.

Crawling is achieved by a sequence of motions of pipe crawler 10 involving cylinders 42 and foot pads 32 and 34 which are pushed radially outward to engage the wall of the pipe thereby supporting pipe crawler 10. Pads 32 and 34 are each operated by pneumatic cylinders, or other convenient means, within extendable legs 24 and 26, respectively.

Extendable legs 24 and 26 are extended by front and rear leg extension mechanisms 44 and 46, respectively and more fully described below, to increase the range of foot pads 32 and 34. Front leg extension mechanism 44 is in retracted position in front leg assembly housing 16, withdrawn into a slot 52 in housing 16. Rear leg extension mechanism 46 is in extended position in rear leg assembly housing 22, projecting from a slot 54 in housing 22.

A first control system is required for cylinders 42 and foot pads 32 and 34 to achieve the crawling sequence. The first control system comprises a conventional set of switches to power these components in the selected combination of steps. A second control system is required for operating front and rear leg extension mechanisms 44 and 46 when pipe crawler 10 is in a pipe or enters a portion of a pipe of substantially different diameter. The second control system is also simply a switch in operative connection with a power source and with perhaps a pressure or distance sensor to recognize larger diameter portions of pipes as they are approached by crawler 10.

Figure 2:
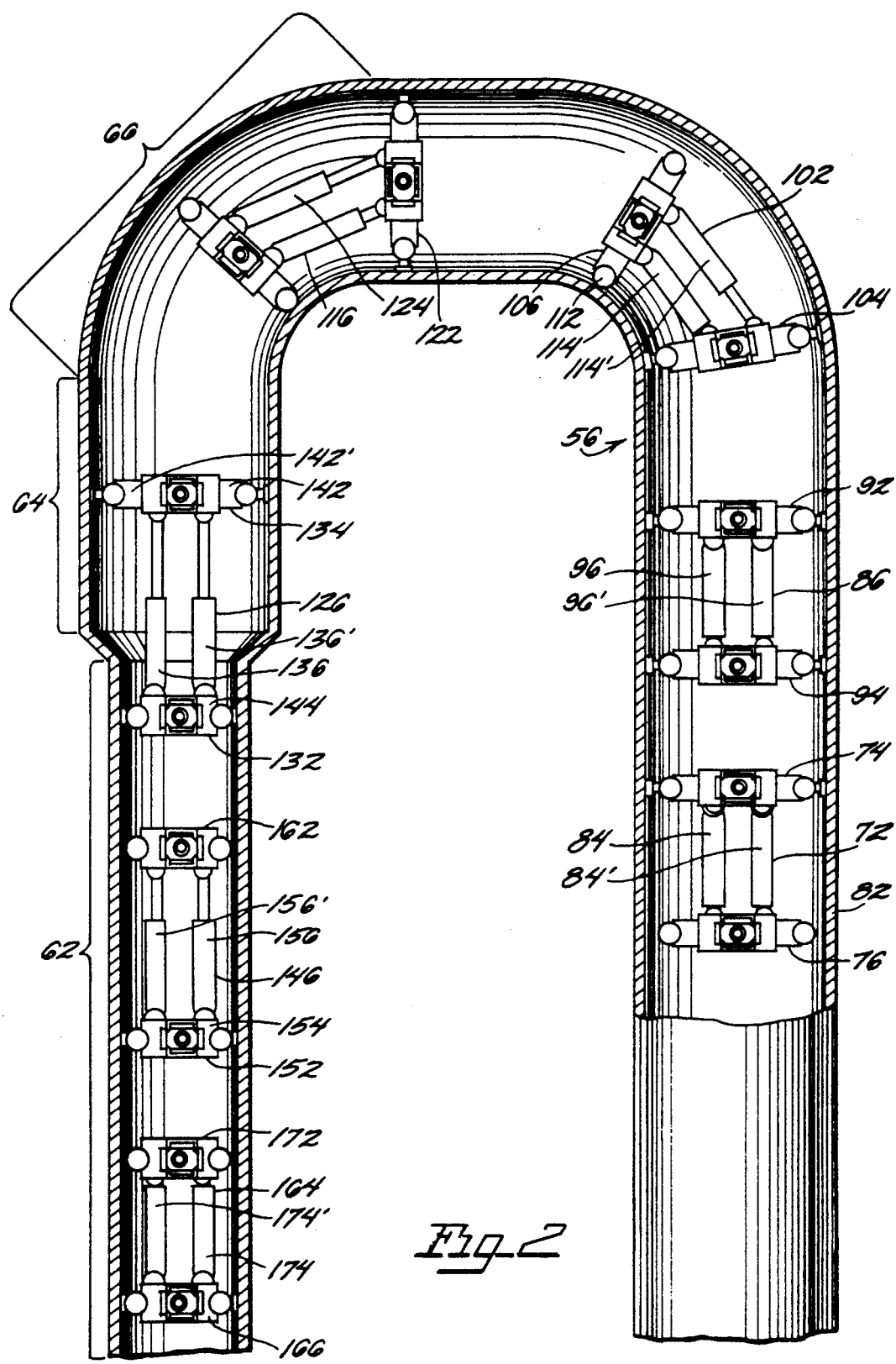
FIG. 2 is a side view of a large diameter pipe, partially cut away, with six pipe crawlers therein in various stages of crawling with legs extended in the larger diameter sections of the pipe according to the present invention.

FIG. 2 shows a series of pipe crawlers in different phases of crawling in a pipe having a narrower portion 62 joined to a wider portion 64 and pipe bends 66. The motion is generally described as "inchworm-like".

Pipe crawler 72 is supported by front leg assembly 74; rear leg assembly 76 has disengaged from wall 82 of pipe 56. Cylinders 84, 84' are in a retracted position.

Pipe crawler 86 is supported by both front and rear leg assemblies 92, 94; and cylinders 96, 96' are still in retracted position.

Pipe crawler 102 is supported by rear leg assembly 104 so that front leg assembly 106 can advance around the pipe bend, rolling on wheels 112 since foot pads are retracted. Cylinders 114, 114' are shown extending.

Pipe crawler 116 is also supported by rear leg assembly 122 with cylinder 124 fully extended as crawler 116 negotiates the pipe bend.

Pipe crawler 126 is supported by both front and rear leg assemblies 132 and 134, respectively, with cylinders 136, 136' fully extended. Rear leg assembly 134 extendable legs 142, 142' are extended in wider portion of pipe 64; front leg assembly 132 extendable legs are retracted into front leg assembly housing 144 to negotiate narrower portion 62 of pipe 56.

Pipe crawler 146 is supported by front leg assembly 152, with extendable legs retracted into front leg assembly housing 154 and cylinders 156, 156' bringing up rear leg assembly 162.

Pipe crawler 164 is also supported by front leg assembly 166 as rear leg assembly 172 has been brought forward all the way be the retraction of cylinders 174, 174'.

Figure 3:
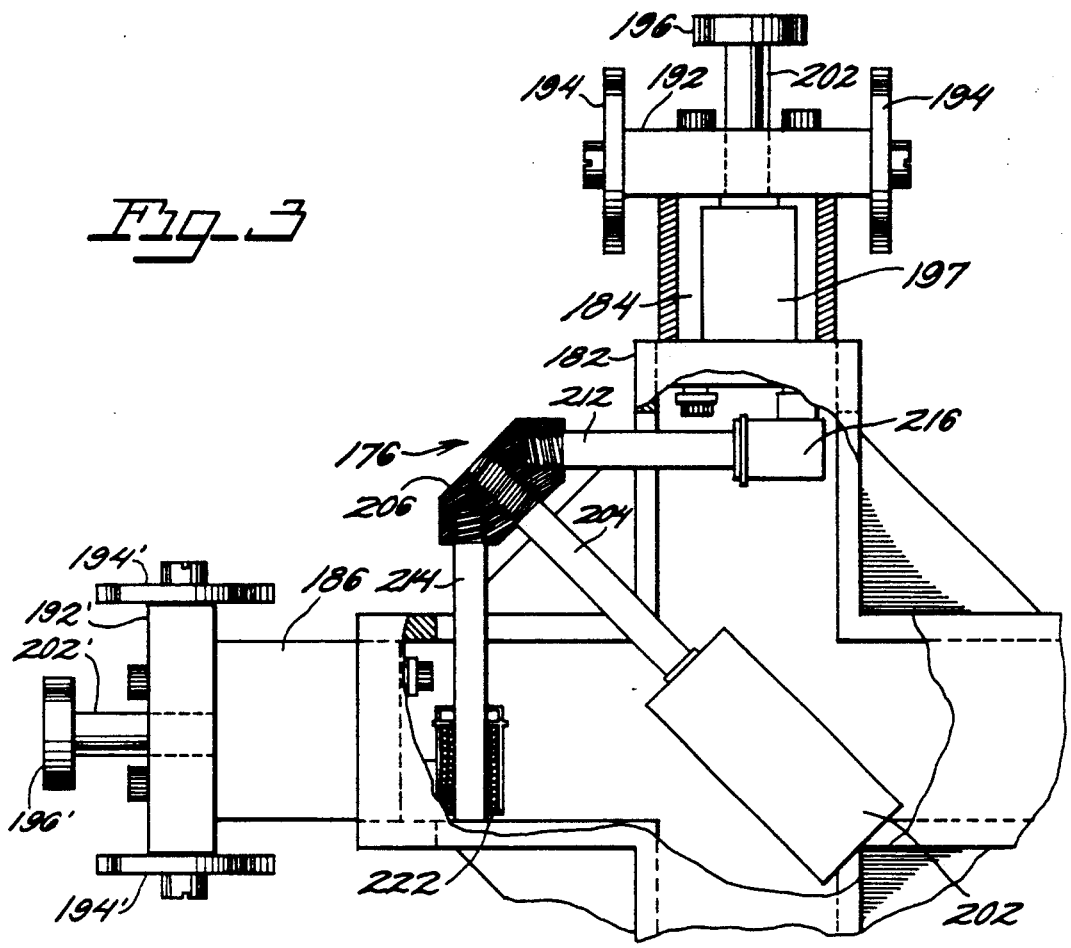
FIG. 3 is a partially cross-sectional view of one leg assembly illustrating the legs in an extended position according to the present invention.

FIG. 3 shows a detailed end view of an extendable leg assembly 176, partially cut away to the show leg extension mechanism for extending the legs. Assembly 176 comprises a housing 182 with four extendable legs, legs 184 and 186 shown in FIG. 3. Each leg has a wheel bracket 192, 192', wheels 194, 194', and a foot pad 196, 196'. Foot pads 196, 196' are radially extended by actuators 197 (the actuator in leg 186 operating foot pad 196' not shown) mounted within extendable legs 184 and 186, which are preferably pneumatic cylinders, one in each leg, for driving shafts 202 and 202' and thus foot pads 196, 196'.

In order to extend the range of extendable legs 184 and 186, extendable legs 184 and 186 are made to slide easily within the channels formed in housing 182. Legs 184 and 186 are moved by a second actuator, located so that it drives a shaft 204 having an axis positioned between adjacent legs 184 and 186, preferably at a 45 degree angle with respect to the axes of shafts 202 and 202'. In a preferred embodiment, two such actuators are positioned adjacent to each other, their axes parallel, but acting in opposing directions to move different sets of extendable legs.

To move extendable legs 184 and 186, actuator 202 drives shaft 204 radially outward. Shaft 204 is connected to a coupler assembly 206 which in turn is connected to two additional shafts 212 and 214 which translate the motion of shaft 204 radially outward from housing 182 between legs 184 and 186 to motion directing extendable legs 184 and 186 radially outward by their attachment to legs 184 and 186. Shafts 212 and 214 slide through linear ball bushings 216 and 222, which are rigidly linked to legs 184 and 186, respectively. In an alternate embodiment, a single actuator, mounted axially and coupled to the extendable legs of a leg assembly by linkages could extend the extendable legs all at once "umbrella" fashion. Two actuators, however, can provide additional flexibility in a pipe where the interior wall is not perfectly round throughout.

Figure 4:
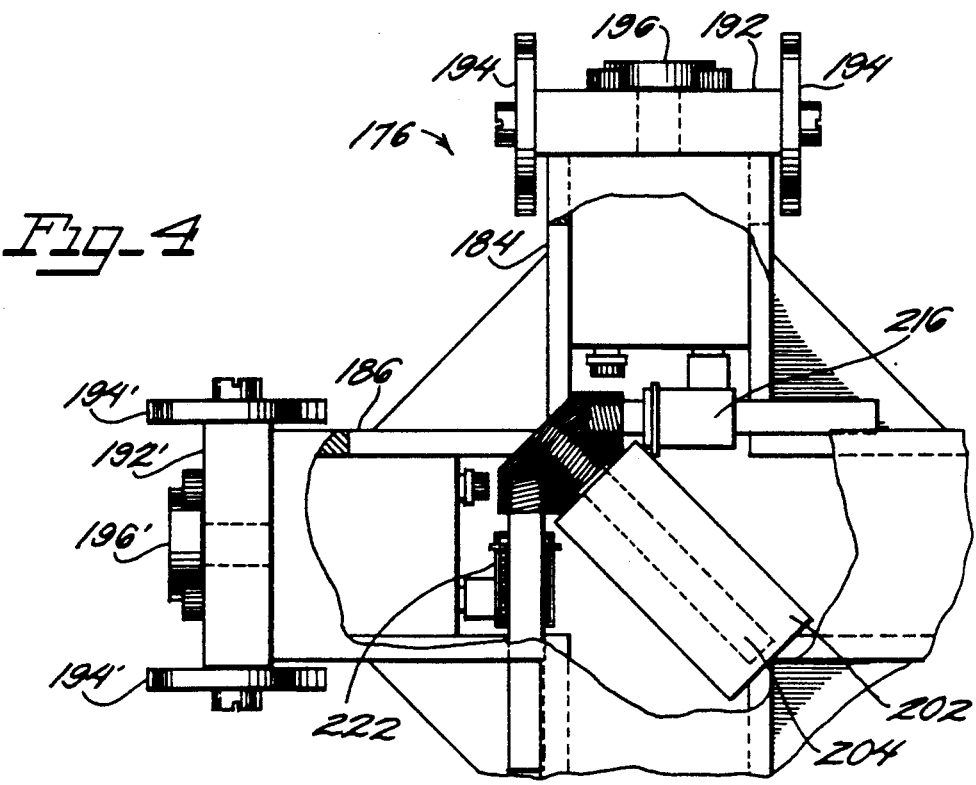
FIG. 4 is a partially cross-sectional view of one leg assembly illustrating the legs in the nonextended position according to the present invention.

FIG. 4 shows extendable legs 184 and 186 retracted as actuator 202 drives shaft 204 radially inward, causing shafts 212 and 214 also to draw radially inward moving through linear bushings 216 and 222.

FIG. 5 shows a detailed side view of a front leg assembly 224, partially cut away. Inside housing 226 are four extendable leg assemblies, two of which are shown, 232 and 234, each having wheels 236 and 236', and wheel bracket 242 and 242'. Actuators 244 and 244' are shown adjacent, parallel and oppositely directed to drive shafts (not shown) connected to coupler assemblies 246 and 246' which are in turn connected to shafts 252 and 252'.

Attached to housing 226 is mounting plate 254 for use in attaching inspection instrumentation and controls. Mounting plate 254 is attached by bolts 256 and 256' running through sleeves 262 and 262' which straddle actuators 244 and 244'. Opposite mounting plate 254 are two pneumatic cylinders 264, 264', shown only in part, for changing the spacing between front leg assembly 224 and rear leg assembly (not shown in FIG. 5).

Although actuators for foot pads and for extendable legs may be any type of cylinder, they are preferably pneumatic cylinders, but any actuator capable of advancing a shaft, such as a solenoid or other electromechanical or mechanical device can be used. Control of pipe crawler is preferably done by controlling the foot pads and the axial pneumatic cylinders together so that the crawling motion can be performed in sequence and controlling the actuators of the extendable legs separately, perhaps using a pressure or distance feedback system to activate them. Foot pads may be fitted with a high friction material to increase the gripping power of the pipe crawler on the wall of the pipe. The gripping material may be fastened by glueing or other convenient means.

It will be evident that variations in the specific design of the above-described pipe crawler may be made without departing from the spirit and scope of the invention which is set forth in the following claims.

What is claimed is:

1. An apparatus for moving through a passage defined by a closed wall, said apparatus comprising:
    a housing having a plurality of channels radially disposed;
    a plurality of first actuators, each of said first actuators slideably mounted within one of said channels;
    a plurality of foot pad means for engaging and disengaging said wall, each of said foot pad means in operative connection with and deployable radially outward by each of said plurality of first actuators; and
    extension mechanism means for sliding said first actuators radially in said channels to change the range of said plurality of foot pad means.

2. The apparatus of claim 1 wherein said extension mechanism means further comprises:
    at least one second actuator inoperative connection with said plurality of first actuators so that said at least one second actuator can slide said plurality of first actuators in said channels thereby changing the range of said foot pads.

3. The apparatus of claim 2 wherein said at least one second actuator is mounted in the same plane as said plurality of first actuators.

4. The apparatus of claim 2 wherein said at least one second actuator further comprises a pair of second actuators mounted in parallel, adjacent and opposingly directed relation, each of said second actuators in operative connection with at least two first actuators of said plurality of first actuators.

5. A pipe crawler for moving through a passage defined by a closed wall, said pipe crawler comprising:
    a front leg assembly having a first plurality of radially extendable legs;
    a rear leg assembly spaced axially from said front leg assembly and having a second plurality of radially extendable legs;
    advancing means connecting said front and said rear leg assemblies for changing the spacing between said front and rear leg assemblies;
    extension means for moving said first and said second plurality of extendable legs radially so that said first and second plurality of extendable legs can have different radial ranges, said extension means having
    a first pair of actuators in operative connection with said front leg assembly, each of said first pair of actuators adapted for moving radially two adjacent extendable legs of said front leg assembly, and
    a second pair of actuators in operative connection with said rear leg assembly, each of said actuators of said second pair moving two adjacent extendable legs of said rear leg assembly,
    said actuators of said first pair and second pair of actuators being parallel, adjacent and opposingly operative and having a pneumatic cylinder with a shaft,
    said first pair of actuator mounted within said front leg assembly so that said shaft moves along an axis approximately midway between said two adjacent extendable legs;
    first control means for actuating said first and said second plurality of extendable legs said first and second plurality of extendable alternatingly engaging and disengaging said passage, so that said pipe crawler moves along said passage; and
    second control means in operative connection with said advancing means for actuating said advancing means, said advancing means alternatingly increasing and decreasing the spacing between said front and rear leg assemblies, respectively.

6. The pipe crawler of claim 5, wherein said first plurality of extendable legs has four extendable legs and said second plurality of extendable legs has four extendable legs.

7. A pipe crawler for moving through a passage defined by a closed wall, said pipe crawler comprising:
    a front leg assembly having a first plurality of radially extendable legs, each extendable leg of said first plurality of extendable legs having a radially extendable foot pad;
    a rear leg assembly having a second plurality of radially extendable legs, each extendable leg of said second plurality of extendable legs having a radially extendable foot pad, said rear leg assembly spaced apart from said front leg assembly;
    front radial movement means for extending said foot pads of said first plurality of extendable legs, said front radial movement means in operative connection with said foot pads of said first plurality of extendable legs,
    said front and rear leg assemblies each having four legs;
    rear radial movement means for extending said foot pads of said second plurality of extendable legs, said rear radial movement means in operative connection with said foot pads of said second plurality of extendable legs;
    axial movement means in operative connection with said front and rear leg assembly for changing the spacing between said front and said rear leg assembly;
    means in operative connection with said first and said second plurality of radially extendable legs for extending said first and said second plurality of radially extendable legs, said extending means providing, for both said front leg assembly and for said rear leg assembly
    two first shafts, each first shaft of said two first shafts having an axis lying between two adjacent extendable legs a pair of adjacent, parallel, oppositely acting pneumatic cylinders, each cylinder oriented to drive one of said two first shafts, each of said two first shafts coupled to two second shafts, each second shaft engaging one of said adjacent extendable legs so that, as each of said pneumatic cylinders drives one of said two first shafts, each of said second shafts extends one extendable leg;

first control means in operative connection with said axial movement means and said front and rear radial movement means for controlling said axial movement means and said front and rear radial movement means;

second control means in operative connection with said front and rear radial movement means for controlling said first and said second extendable legs.

8. The pipe crawler of claim 7 further comprising platform means attached to said front leg assembly for mounting inspection instrumentation thereon.

* * * * *